April 29, 1952      E. H. LEHMAN      2,594,462
FRICTION SHOCK ABSORBER FOR RAILWAY CAR TRUCKS
Filed April 28, 1950
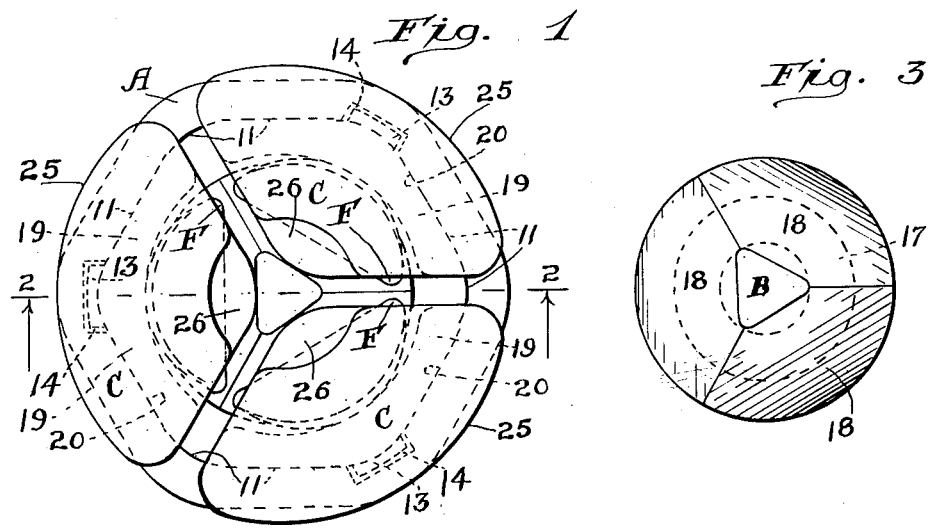
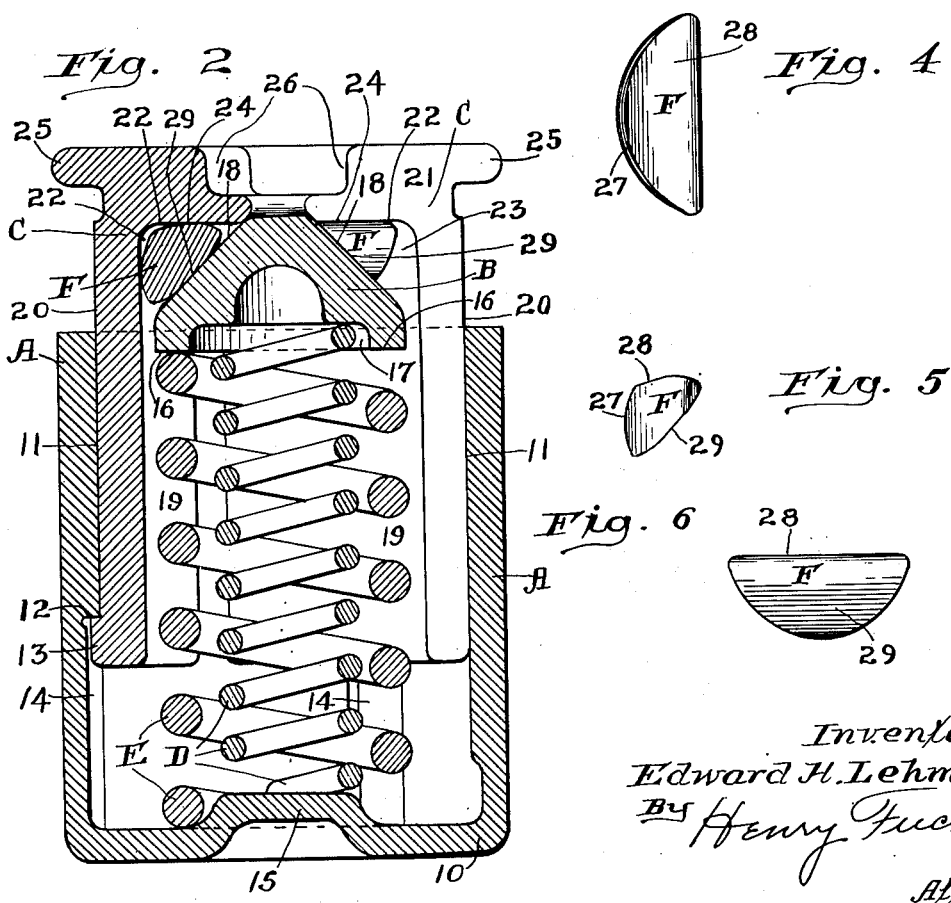
Inventor:
Edward H. Lehman.
By Henry Fuchs
Atty.

Patented Apr. 29, 1952

2,594,462

UNITED STATES PATENT OFFICE 2,594,462

FRICTION SHOCK ABSORBER FOR RAILWAY CAR TRUCKS

Edward H. Lehman, Chicago, Ill., assignor to W. H. Miner, Inc., Chicago, Ill., a corporation of Delaware Application April 28, 1950, Serial No. 158,660

3 Claims. (Cl. 267—9)

1

This invention relates to improvements in friction shock absorbers, especially adapted for use in connection with railway car trucks for snubbing the vertical action of the truck springs.

One object of the invention is to provide a friction shock absorber of the character indicated, comprising a friction casing, elongated friction shoes slidingly telescoped within the casing, a combined wedge and spring follower member cooperating with wedge faces at the outer ends of the shoes to spread the same apart, retaining lugs on the shoes engaging stop shoulders on the casing, and spring means reacting between the casing and combined wedge and spring follower member for forcing the latter against the shoes, wherein the shoes are provided with removable inserts having wedge faces cooperating with the combined wedge and spring follower member, whereby a variety of different inserts may be provided having wedge faces differing in inclination to alter the wedging system without any structural changes of the shoes proper being required.

A further object of the invention is to provide a mechanism as set forth in the preceding paragraph, wherein the inserts have rocking engagement both with the shoes and combined wedge and spring follower member to provide for flexibility.

Other objects of the invention will more clearly appear from the description and claims hereinafter following.

In the accompanying drawing forming a part of this specification, Figure 1 is a top plan view of my improved shock absorber. Figure 2 is a transverse, vertical sectional view, corresponding substantially to the line 2—2 of Figure 1. Figure 3 is a top plan view of the combined wedge and spring follower member of my improved mechanism. Figure 4 is a top plan view of one of the removable inserts employed in connection with the friction shoes. Figure 5 is an end elevation of Figure 4, looking downwardly in said figure. Figure 6 is a side elevational view of Figure 4, looking from right to left in said figure.

As shown in the drawing, my improved shock absorber comprises broadly a friction casing A, a combined wedge and spring follower member B, three friction shoes C—C—C, inner and outer springs D and E, and removable inserts F—F—F for the friction shoes.

The casing A is in the form of a tubular member of hexagonal, transverse cross section, open at its top and having a transverse wall 10 at its bottom end. The casing A is provided with three lengthwise extending, interior friction surfaces 11—11—11 of V-shaped, transverse cross section. At the alternate corners, the casing presents horizontal stop shoulders 12—12—12, with which lugs 13—13—13 on the shoes C—C—C are engageable to limit outward movement of the shoes with respect to the casing. The shoulders 12—12—12 are provided at the upper ends of guide slots 14—14—14 interiorly of the casing. The bottom wall 10 of the casing is provided with an upwardly projecting, hollow, central boss 15, adapted to accommodate the usual spring centering projection of the bottom spring follower plate of the truck spring cluster of a railway car.

The combined wedge and spring follower member B is in the form of a block having a flat bottom face 16, provided with a central seat 17 for the upper end of the spring D. At the upper end, the member B has three upwardly converging wedge faces 18—18—18 which are preferably flat. The member B is arranged within the open end of the casing A and is surrounded by the shoes C—C—C.

The friction shoes C are three in number, arranged symmetrically around the central longitudinal axis of the mechanism between the member B and the V-shaped, interior friction surfaces 11—11—11 of the casing. Each shoe C comprises a relatively heavy, platelike section 19, having lengthwise extending friction surfaces 20 on the outer side, of V-shaped, transverse section, engaged with the corresponding V-shaped friction surface 11 of the casing. At the top end thereof, the platelike section 19 of the shoe C has an inward enlargement in the form of a head 21 on its inner side, presenting a substantially flat, bottom face 22 which extends in horizontal direction away from the inner side of the platelike section 19 of said shoe. The inner surface of each shoe, which surface is indicated by 23, is transversely curved, or rounded, and extends at right angles to the face 22. The right angularly disposed face 22 and the surface 23 of each shoe provide a pocket 24 within which the corresponding insert F is accommodated. At the outer side of the shoe, the head 21 thereof has a laterally outwardly extending, horizontal flange 25, which overhangs the upper end of the casing A and is adapted to engage with the upper end of said casing to limit downward movement of the shoe in a direction inwardly with respect to the casing.

The shoes C—C—C are recessed on their inner sides at the upper ends, as indicated at 26—26—26, to provide a seat for the usual spring centering lug of the top spring follower plate of a cluster of truck springs.

The inserts F are three in number, one for each shoe. The insert F of each shoe is arranged in the pocket 24 thereof, and has a transversely curved, vertically rounded or crowned, outer side face 27, bearing on the vertically disposed inner surface 23 of said shoe, a transversely rounded or crowned, top face 28 bearing on the bottom face 22 of the head 21 of said shoe, and a wedge face 29 on its inner side, bearing on and correspondingly inclined to the corresponding wedge face 18 of the member B. As will be evident, the inserts have rocking adjustment on the shoes on the faces 22 and surfaces 23 of the latter, and further, have rocking adjustment on the wedge faces 18 of the combined wedge and spring follower member B.

The springs D and E are in the forms of helical coils, the spring D being seated on the boss 15 of the casing A and having its top end engaged in the seat 17 of the member B. The spring E surrounds the spring D and has its top and bottom ends bearing respectively on the face 16 of the member B and the wall 10 of the casing A.

My improved shock absorber preferably replaces one or more of the spring units of a truck spring cluster of a railway car, being interposed between the top and bottom spring plates of said cluster.

The operation of my improved shock absorber is as follows: Upon the shoes C—C—C being forced inwardly of the casing A during compression of the truck springs of the car, they are spread apart by the spring resisted combined wedge and spring follower member B, through wedging engagement of the latter with the inserts F—F—F of the shoes, thereby providing high frictional resistance as the shoes are forced to slide downwardly on the friction surfaces 11—11—11 of the casing, to dampen the action of the truck springs. Inasmuch as the inserts of the shoes are rockable on the wedge faces of the member B and are also rockable on the horizontal and vertical faces and surfaces of the pockets 24 of said shoes, a high degree of flexibility is provided in the mechanism, with the result that the shoes will at all times be held in true contact with the interior friction surfaces of the casing with the lugs 13 of said shoes in proper cooperative relation with the stop shoulders 12 of the casing.

I claim:

1. In a friction shock absorber, the combination with a friction casing; of friction shoes slidingly telescoped within the casing; inserts within the shoes in rocking engagement therewith, said inserts having lengthwise crowned wedge faces thereon; a combined wedge and spring follower member, having wedge faces engaged with the wedge faces of said inserts of said shoes; and spring means within the casing yieldingly opposing inward movement of said member.

2. In a friction shock absorber, the combination with a friction casing having interior, vertically extending friction surfaces; of friction shoes slidingly telescoped within the casing, said shoes having laterally inwardly opening pockets at their upper ends, presenting horizontally disposed, upper end walls, and vertically disposed back walls; inserts within said pockets, each insert having rounded, top and back bearing faces in rocking engagement with the upper end and back walls of the pocket of the corresponding shoe; a combined wedge and spring follower member having wedge faces, each of said inserts having a wedge face correspondingly inclined to and engaged with the corresponding wedge face of said member; and spring means within the casing yieldingly opposing inward movement of said member.

3. In a friction shock absorber, the combination with a friction casing having interior, vertically extending friction surfaces; of friction shoes slidingly telescoped within the casing, said shoes having laterally inwardly opening pockets at their upper ends, presenting horizontally disposed, upper end walls, and vertically disposed back walls; inserts within said pockets, each insert having rounded, top and back bearing faces in rocking engagement with the upper end and back walls of the pocket of the corresponding shoe; a combined wedge and spring follower member having wedge faces, each of said inserts having a rounded wedge face correspondingly inclined to and engaged with the corresponding wedge face of said member; and spring means within the casing yieldingly opposing inward movement of said member.

EDWARD H. LEHMAN.

REFERENCES CITED

The following references are of record in the file of this patent:

UNITED STATES PATENTS

| Number | Name | Date |
|---|---|---|
| 754,670 | Miner | Mar. 15, 1904 |
| 1,254,262 | O'Connor | Jan. 22, 1918 |
| 1,680,308 | Strid | Aug. 14, 1928 |
| 2,257,109 | Davidson | Sept. 30, 1941 |
| 2,417,410 | Gray | Mar. 18, 1947 |
| 2,417,545 | Dath | Mar. 18, 1947 |
| 2,456,635 | Heater | Dec. 21, 1948 |